(12) United States Patent
Ye

(10) Patent No.: US 10,293,772 B2
(45) Date of Patent: May 21, 2019

(54) BUMPER LIGHT ASSEMBLY OF GOLF CART

(71) Applicant: CHONGQING RICHLAND MOLD CORP., Chongqing (CN)

(72) Inventor: Lin Ye, Chongqing (CN)

(73) Assignee: CHONGQING RICHLAND MOLD CORP., Chongqing (CN)

( * ) Notice: Subject to any disclaimer, the term of this patent is extended or adjusted under 35 U.S.C. 154(b) by 47 days.

(21) Appl. No.: 15/712,131

(22) Filed: Sep. 21, 2017

(65) Prior Publication Data

US 2018/0029552 A1 Feb. 1, 2018

(30) Foreign Application Priority Data

Aug. 23, 2017 (CN) .................... 2017 2 1064659 U

(51) Int. Cl.
*B60R 19/48* (2006.01)
*B60R 19/50* (2006.01)
*A63B 55/60* (2015.01)

(52) U.S. Cl.
CPC .............. *B60R 19/50* (2013.01); *A63B 55/61* (2015.10); *B60R 2019/505* (2013.01)

(58) Field of Classification Search
CPC ........... B62B 5/0006; B62B 3/02; B62B 5/06; B62B 3/14; B62B 3/005; C08L 23/02; B29C 66/7212
USPC ...................................................... 293/117
See application file for complete search history.

(56) References Cited

U.S. PATENT DOCUMENTS

| | | | | |
|---|---|---|---|---|
| 1,993,675 A | * | 3/1935 | Long | B61D 11/00 213/220 |
| 3,196,265 A | * | 7/1965 | Schneider | B60R 19/50 362/505 |
| 4,958,068 A | * | 9/1990 | Pong | B60R 19/02 180/167 |
| 5,833,283 A | * | 11/1998 | Shaw | B60Q 1/30 293/117 |
| D757,316 S | * | 5/2016 | Wymore | D26/31 |
| D805,010 S | * | 12/2017 | Ye | D12/171 |
| 9,840,218 B1 | * | 12/2017 | Wymore | B60R 19/50 |
| D809,684 S | * | 2/2018 | Wymore | D26/34 |
| 2015/0021937 A1 | * | 1/2015 | Perez | B60Q 1/0005 293/115 |

(Continued)

*Primary Examiner* — Kiran B Patel
(74) *Attorney, Agent, or Firm* — Cheng-Ju Chiang

(57) ABSTRACT

The present invention discloses a bumper-cart light assembly of a golf cart. The bumper-cart light assembly includes a bumper body, a lower support, an integral cart light assembly and two upper supports. The two upper supports are symmetrically arranged at the upper end of the bumper body respectively. The lower support is arranged at the lower end of the bumper. The periphery of the bumper body extends rearwards to form a recess. The upper end of the bumper body forms a connecting tab. The upper end of the bumper protrudes upwards to form a protrusion provided with a receiving groove. The two upper supports are located at the two sides of the protrusion respectively. The middle of the bumper body is provided with an air inlet. The lower end of the bumper body is provided with an upward recess. The bumper-cart light assembly can carry a driving light assembly.

8 Claims, 10 Drawing Sheets

(56) References Cited

U.S. PATENT DOCUMENTS

2015/0021942 A1* 1/2015 Evans ............... B60R 19/50
 293/142
2016/0193958 A1* 7/2016 Smith ............... B60Q 1/28
 362/473

* cited by examiner

BUMPER LIGHT ASSEMBLY OF GOLF CART

TECHNICAL FIELD

The present utility model relates to the technical field of golf carts, and more particularly, to a bumper light assembly of a golf cart.

BACKGROUND

With development of the automobile industry and wide application of engineering plastics in that industry, the safety performance of automobile bumpers, which act as safety devices for absorbing and buffering external impact and for protecting pedestrians and both front and rear portions of automobile bodies, is receiving increasing attention. However, usually a bumper can only absorb energy and cannot carry a vehicle light assembly. At present, vehicle light assemblies are provided on the automobile body housings.

SUMMARY

The technical problem to be solved by the present utility model is to provide a bumper light assembly of a golf cart, which can carry a cart light assembly.

To solve the above problem, the present utility model provides a bumper light assembly of a golf cart, comprising a bumper body, a lower support, an integral cart light assembly and two upper supports, wherein the two upper supports are symmetrically arranged at the upper end of the bumper body respectively, and the lower support is arranged at the lower end of the bumper; the periphery of the bumper body extends rearwards to form a recess, the upper end of the bumper body forms a connecting tab, the upper end of the bumper protrudes upwards to form a protrusion provided with a receiving groove, the two upper supports are located at the two sides of the protrusion respectively, the middle of the bumper body is provided with an air inlet, the lower end of the bumper body is provided with an upward recess, and the cart light assembly is provided on the connecting tab.

Further, the lower support includes a support body and a cart frame connecting plate, the cart frame connecting plate being arranged on the support body.

Further, the lower end of each upper support is bent forwards, and the upper end of each upper support is bent towards the two sides of the bumper body.

Further, the bumper light assembly of a golf cart includes a cart light assembly; the cart light assembly includes a reflective bowl member, a heat radiating plate, a light shade and two turn light cover plates; the light shade shades the reflective bowl member; the heat radiating plate and the two turn light cover plates are fixed on the reflective bowl member respectively; the heat radiating plate is configured to radiate heat for a head light; the two turn light cover plates are located at the two ends of the reflective bowl member respectively for shading turn lights.

Further, the reflective bowl member includes a housing, a head light reflective bowl component and two turn light reflective bowl components; the head light reflective bowl component is arranged in the middle of the housing; the two turn light reflective bowl components are arranged at the two ends of the housing respectively; partition plates are arranged between the head light reflective bowl component and the turn light reflective bowl components; the housing is provided with a first hood and two second hoods; the head light reflective bowl component is located in the first hood; the turn light reflective bowl components are located in the second hoods respectively; reinforcing ribs are provided between the first and second hoods respectively; an edge of the housing is provided with a positioning protrusion; the two ends of the housing are bent rearwards; the housing is provided with a first fixing column and second fixing columns; the first fixing column is used to connect with the bumper; and the second fixing columns are used to fix the turn light cover plates respectively.

Further, the turn light reflective bowl component is provided with a positioning column.

Further, the turn light cover plate includes a cover plate body, a pair of first fixing feet and a pair of second fixing feet; the first and second fixing feet are provided on the cover plate body, and are distributed in the form of steps.

Further, the cover plate body is provided with a sealing groove and a wire passing hole; a waterproof sealing plug is arranged in the wire passing hole.

Further, the heat radiating plate includes a heat radiating body and several heat radiating sheets respectively provided on the heat radiating body.

Further, a head light plate is arranged between the reflective bowl member and the heat radiating plate.

In the bumper light assembly of a golf cart of the present utility model, the upper end of the bumper is bent rearwards to form a connecting tab for carrying the cart light assembly; the reflective bowl member of the cart light assembly includes a head light reflective bowl component and turn light reflective bowl components, so that it is unnecessary to separately package the head light reflective bowl component and the turn light reflective bowl components; therefore, packaging can be finished by one step, which is convenient and consumes less time and labor.

FIG. 1 is a schematically structural view of a bumper light assembly of a golf cart according to a preferred embodiment of the present utility model;

DETAILED DESCRIPTION

Figure 1:
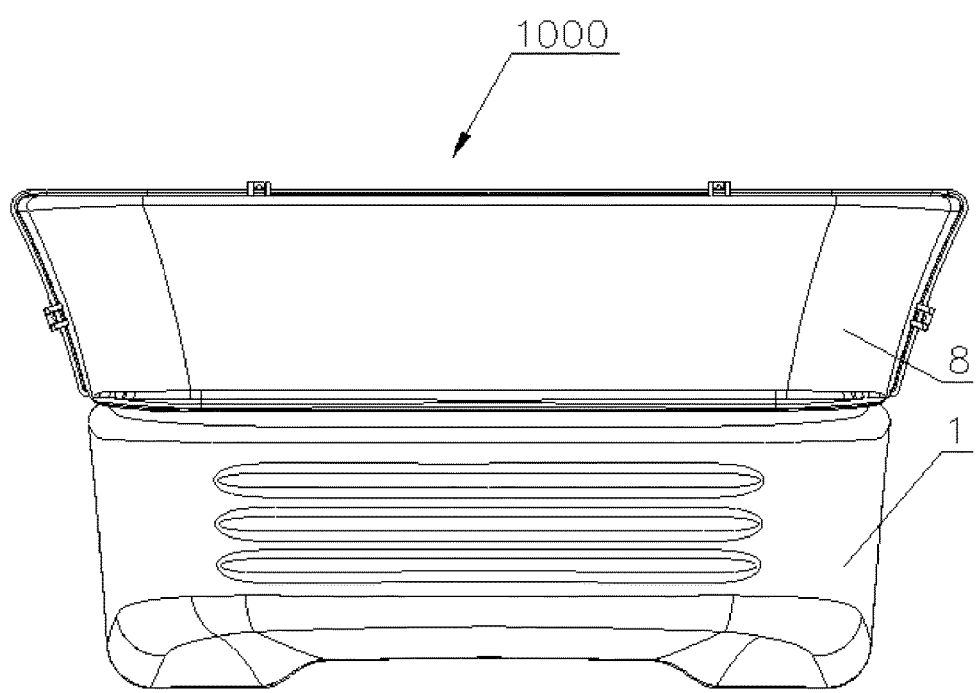
FIG. 1 is a schematically structural view of a bumper-cart light assembly of a golf cart according to a preferred embodiment of the present utility model.
Figure 2:
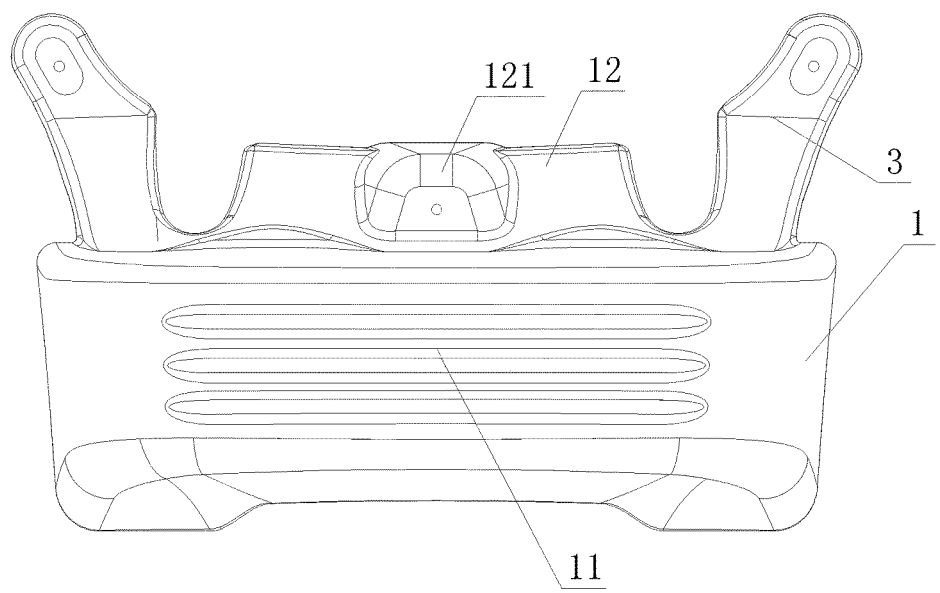
FIG. 2 is a schematically structural view of a bumper body.
Figure 3:
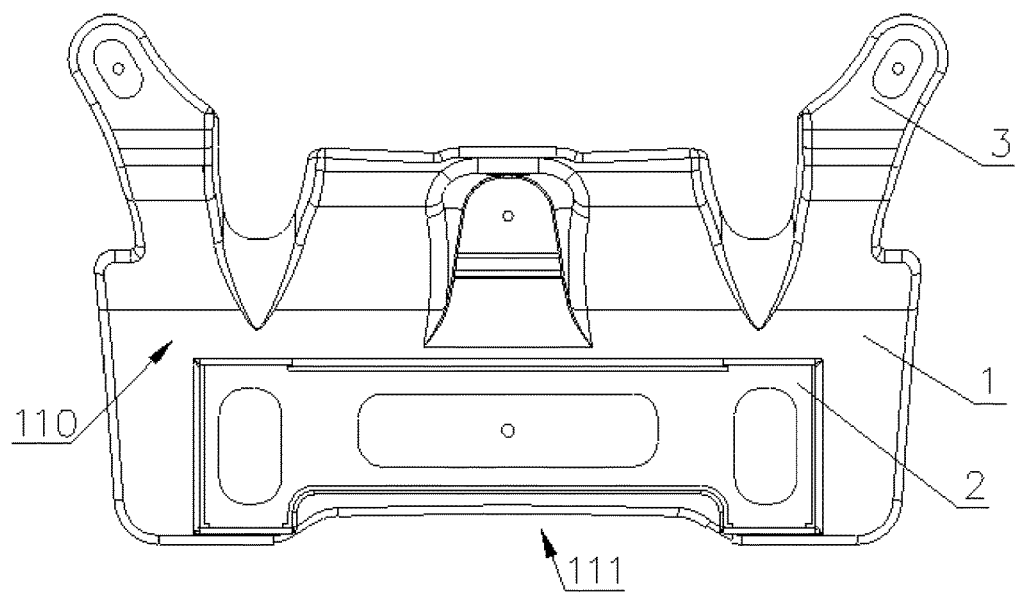
FIG. 3 is a rear view of the bumper body.
Figure 4:
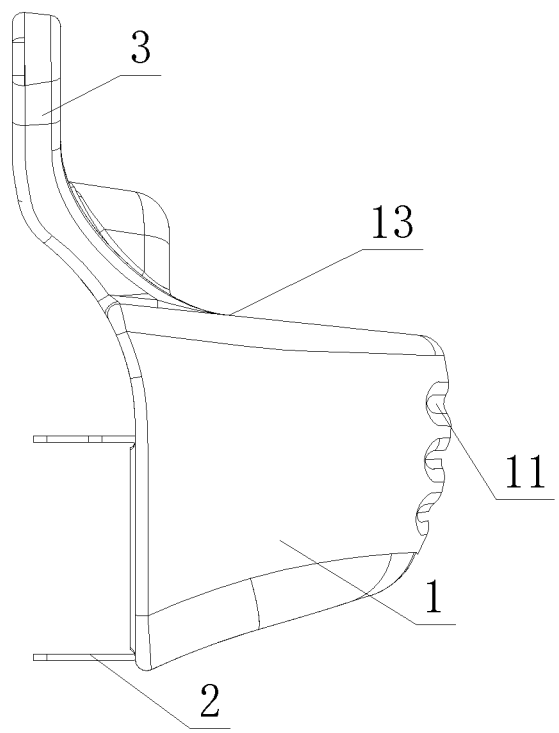
FIG. 4 is left view of the bumper body.

The present utility model will now be further described with reference to the drawings.

Referring to FIG. 1-4, a bumper light assembly 1000 of a golf cart according to a preferred embodiment of the present utility model comprises a bumper body 1, a lower support 2, two upper supports 3, and an integral cart light assembly 8. The two upper supports 3 are symmetrically arranged at the upper end of the bumper body 1 respectively. The lower support 2 is arranged at the lower end of the bumper body 1. The cart light assembly 8 is fixed to the bumper body 1. The integral cart light assembly 8 means that the turn lights and the head light are arranged on the same housing.

The periphery of the bumper body 1 extends rearwards to form a recess 110 to enhance the energy absorption effect of the bumper body 1. The upper end of the bumper body 1 forms a connecting tab 13. A material collecting pipe of the connecting tab 13 is used to connect the cart light assembly 8. The upper end of the bumper protrudes upwards to form a protrusion 12 for limiting the cart light assembly 8 and provided with a receiving groove 121, which is used to position the cart light assembly 8 to facilitate quick assemble. The two upper supports 3 are located at the two sides of the protrusion 12 respectively. The two upper supports 3 are integrally formed with the bumper body 1 to facilitate manufacturing. The lower end of the bumper body 1 is provided with an upward recess 111 to match with the cart frame.

The lower end of each upper support 3 is bent forwards to increase a connecting surface area of the connecting tab 13. The upper end of each upper support 3 is bent towards the two sides of the bumper body 1 to increase the stability when fixing is performed.

Figure 5:
FIG. 5 is a schematically structural view of a lower support.

As shown in FIG. 5, the lower support 2 includes a support body 21 and a frame connecting plate 22. The frame connecting plate 22 being provided to the support body 21. The lower end of the support body 21 is provided with upward dodging recesses to match with the cart frame.

The bumper body 1 is fixed to the cart frame via the upper supports 3 and the lower support 2. The lower support 2 is detachably connected to the bumper body 1 to facilitate assembly and disassembly. The upper end of the bumper body 1 is bent rearwards and extends to form the connecting tab 13 for carrying a driving light assembly. Thus, carrying of other components is realized.

Figure 6:
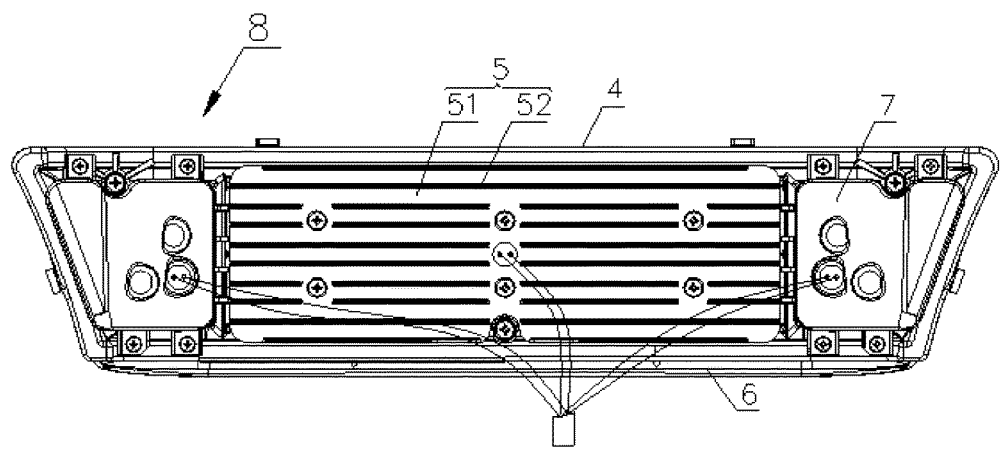
FIG. 6 is a schematically structural view of a cart light assembly.
Figure 7:
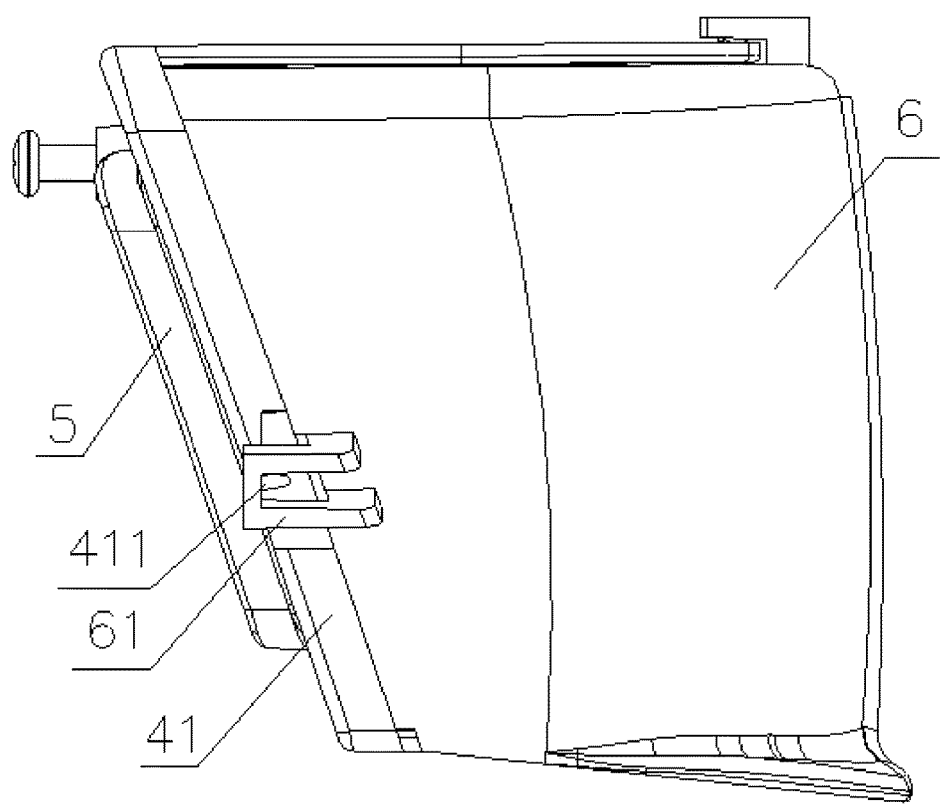
FIG. 7 is a sectional view of a cart light assembly.
Figure 8:
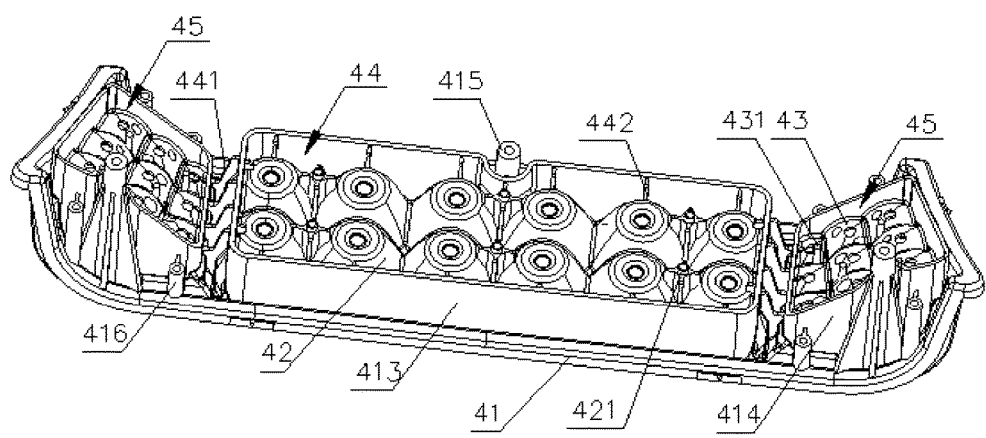
FIG. 8 is a schematically structural view of a reflective bowl member.

As shown in FIGS. 6-8, the light assembly 1000 includes a reflective bowl member 4, a heat radiating plate 5, a light shade 6, a head light plate, and two turn light cover plates 7. The light shade 6 shades the reflective bowl member 4. The heat radiating plate 5 and the two turn light cover plates 7 are fixed on the reflective bowl member 4 respectively. The heat radiating plate 5 is configured to radiate heat for a head light. The two turn light cover plates 7 are located at the two ends of the reflective bowl member 4 respectively for shading turn lights. The head light plate is provided between the reflective bowl member 4 and the heat radiating plate 5 to facilitate installation of the head light.

The reflective bowl member 4 includes a housing 41, a head light reflective bowl component 44, and two turn light reflective bowl components 45. The head light reflective bowl component 44 is arranged in the middle of the housing 41. The two turn light reflective bowl components 45 are arranged at the two ends of the housing 41 respectively. Reinforcing ribs 441 are arranged between the head light reflective bowl component 44 and the turn light reflective bowl components 45 to prevent interference between the head light and the turn light. The housing 41, the head light reflective bowl component 44, and the two turn light reflective bowl components 45 are integrally formed to facilitate manufacturing thereof.

The two ends of the housing 41 are bent rearwards to form a shape of a character "凵". The two turn light reflective bowl components 45 are located at the bends respectively, such that the light from the turn lights can be emitted from the sides, and vehicles behind the cart or at the side of the cart can see the light, thereby improving the safety. An edge of the housing 41 is provided with a positioning protrusion 411 and a clamping groove 412, the positioning protrusion 411 being configured to cooperate with a clamp 31 on the shade 6 for fixing, and the clamping groove 412 being configured to clamp the shade 6. The housing 41 is provided with a first hood 413, two second hoods 414, three first fixing columns 415 and multiple second fixing columns 416. The head light reflective bowl component 44 is located in the first hood 413. The turn light reflective bowl components 45 are located in the second hoods 414 respectively. Reinforcing ribs 441 are provided between the first and second hoods 413, 414 respectively to increase the strength and ensure the service life. The first and second hoods 413, 414 are used to protect the head light reflective bowl component 44 and the turn light reflective bowl components 45 respectively. The first fixing column 415 is used to connect with the bumper body 1. The three fixing columns 415 are distributed in a triangle shape to ensure the fixing stability. The second fixing columns 416 are used to fix the turn light cover plates 7 respectively. A side wall of the first hood 413 is provided with reinforcing ribs 442 to increase the strength of the first hood 413.

The head light reflective bowl component 44 includes multiple head light reflective bowl bodies 42 arranged in rows. Third fixing columns 421 are arranged between horizontally adjacent head light reflective bowl bodies, and are used for fixing the connection between the head light plate and the heat radiating plate 5.

The turn light reflective bowl component 45 includes multiple turn light reflective bowl bodies 43 arranged in rows and in the form of steps, such that light can be emitted from the side surfaces thereof. The turn light reflective bowl component 45 is provided with a positioning column 431 for quickly positioning the turn light plate, such that the turn light and the turn light reflective bowl body do not interfere with the turn light plate, thereby prolonging the service life of the turn light plate.

Figure 9:
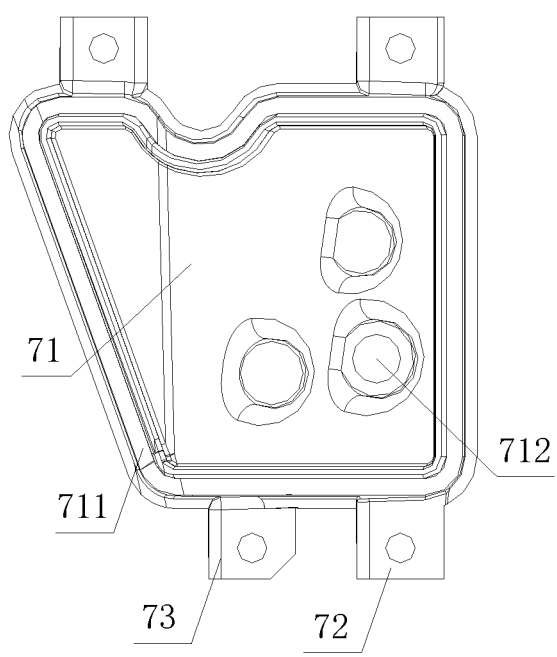
FIG. 9 is a schematically structural view of a turn light cover plate.
Figure 10:
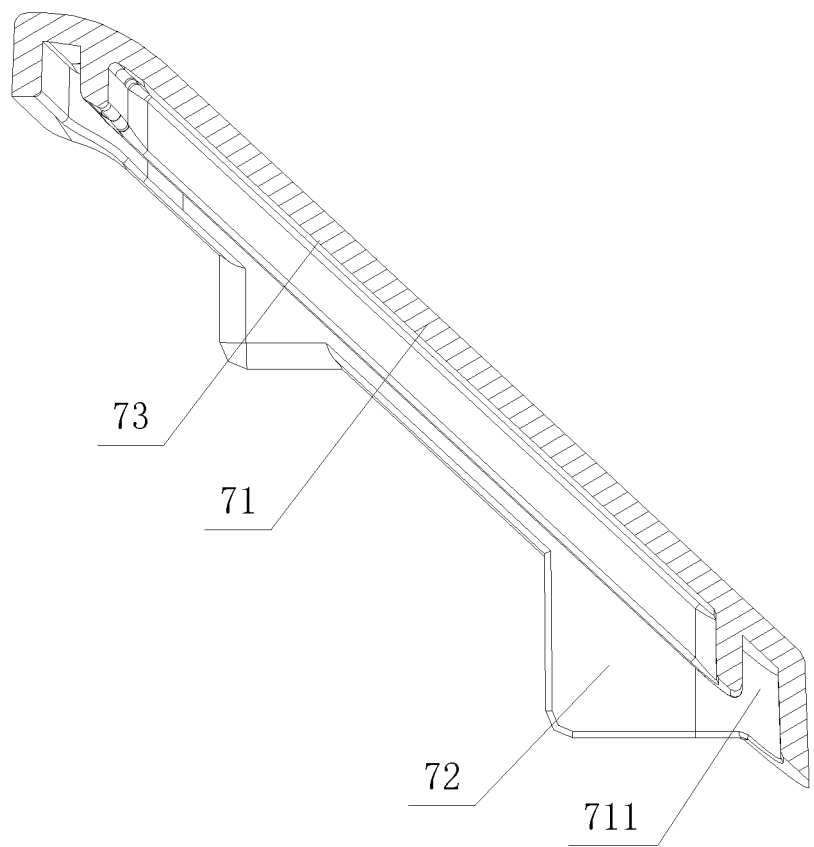
FIG. 10 is a sectional view of a turn light cover plate.

Referring to FIGS. 9-10, the turn light cover plates 7 includes a cover plate body 71, a pair of first fixing feet 72, and a pair of second fixing feet 73. The first and second fixing feet 72, 73 are provided on the cover plate body 71, and are distributed in the form of steps when the first fixing feet 72 are parallel with the horizontal plane, so as to adapt to the bending surfaces at both ends of the reflective bowl member 4. The cover plate body 71 is fixed to the second fixing columns 416 via the first and second fixing feet 72, 73, and is provided with a sealing groove 711 and a wire passing hole 712. A waterproof sealing plug 713 is arranged in the wire passing hole 712 to prevent water vapor from entering the turn light and damaging the same.

As shown in FIG. 6, the heat radiating plate 5 includes a heat radiating body 51 and several heat radiating sheets 52 arranged on the heat radiating body. The heat radiating sheets 52 are arranged in rows to facilitate heat radiation of the head light.

The reflective bowl member 4 includes a head light reflective bowl component 44 and turn light reflective bowl components 45, so that it is unnecessary to separately package the head light reflective bowl component 44 and the turn light reflective bowl components 45. Therefore, packaging can be finished by one step, which is convenient and consumes less time and labor.

The above embodiments are only part of embodiments of the present utility model, and are not intended to limit the patent scope of the present utility model. It should be noted that equivalent structures, which are made using the description and the drawings of the present utility model and directly or indirectly applied to other related technical fields, shall be embraced by the patent protective scope of the present utility model.

The invention claimed is:

1. A bumper light assembly of a golf cart, comprising a bumper body, a lower support, an integral cart light assembly, and two upper supports, wherein the two upper supports are symmetrically arranged at the upper end of the bumper body respectively, and the lower support is arranged at the lower end of the bumper, the periphery of the bumper body extends rearwards to form a recess, the upper end of the bumper body forms a connecting tab, the upper end of the bumper protrudes upwards to form a protrusion provided with a receiving groove, the two upper supports are located at the two sides of the protrusion respectively, the middle of the bumper body is provided with an air inlet, the lower end of the bumper body is provided with an upward recess, and the cart light assembly is on the connecting tab.

2. The bumper light assembly of a golf cart of claim 1, wherein the lower support comprises a support body and a cart frame connecting plate, the cart frame connecting plate being arranged on the support body.

3. The bumper light assembly of a golf cart of claim 1, wherein the cart light assembly comprises a reflective bowl member, a heat radiating plate, a light shade and two turn light cover plates, the light shade shades the reflective bowl member, the heat radiating plate and the two turn light cover plates are fixed on the reflective bowl member respectively, the heat radiating plate is configured to radiate heat for a head light, the two turn light cover plates are located at the two ends of the reflective bowl member respectively for shading turn lights.

4. The bumper light assembly of a golf cart of claim 3, wherein the reflective bowl member comprises a housing, a head light reflective bowl component, and two turn light reflective bowl components, the head light reflective bowl component is arranged in the middle of the housing, the two turn light reflective bowl components are arranged at the two ends of the housing respectively, reinforcing ribs are arranged between the head light reflective bowl component and the turn light reflective bowl components, the housing is provided with a first hood and two second hoods, the head light reflective bowl component is located in the first hood, the turn light reflective bowl components are located in the second hoods respectively, reinforcing ribs are provided between the first and second hoods respectively, an edge of the housing is provided with a positioning protrusion, the two ends of the housing are bent rearwards, the housing is provided with a first fixing column and second fixing columns, the first fixing column is used to connect with the bumper, and the second fixing columns are used to fix the turn light cover plates respectively.

5. The bumper light assembly of a golf cart of claim 3, wherein the turn light reflective bowl component is provided with a positioning column.

6. The bumper light assembly of a golf cart of claim 3, wherein the turn light cover plate comprises a cover plate body, a pair of first fixing feet, and a pair of second fixing feet, the first and second fixing feet are provided on the cover plate body, and are distributed in the form of steps.

7. The bumper light assembly of a golf cart of claim 3, wherein the cover plate body is provided with a sealing groove and a wire passing hole, a waterproof sealing plug is arranged in the wire passing hole.

8. The bumper light assembly of a golf cart of claim 3, wherein the heat radiating plate comprises a heat radiating body and several heat radiating sheets respectively provided on the heat radiating body.

* * * * *